(12) United States Patent
Yoshimura et al.

(10) Patent No.: US 11,100,887 B2
(45) Date of Patent: Aug. 24, 2021

(54) RELAY APPARATUS AND DISPLAY SYSTEM

(71) Applicant: SEIKO EPSON CORPORATION, Tokyo (JP)

(72) Inventors: Yoshihiro Yoshimura, Matsumoto (JP); Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 43 days.

(21) Appl. No.: 16/583,536

(22) Filed: Sep. 26, 2019

(65) Prior Publication Data

US 2020/0105220 A1 Apr. 2, 2020

(30) Foreign Application Priority Data

Sep. 27, 2018 (JP) .............................. JP2018-182320

(51) Int. Cl.
*G06F 1/16* (2006.01)
*G09G 5/00* (2006.01)

(52) U.S. Cl.
CPC ............. *G09G 5/006* (2013.01); *G06F 1/163* (2013.01); *G06F 1/1684* (2013.01); *G09G 2354/00* (2013.01); *G09G 2370/00* (2013.01)

(58) Field of Classification Search
CPC ...... G09G 5/04; G09G 5/006; G09G 2354/00; G09G 2370/00; G06F 1/163; G06F 1/1684; H04N 13/332; H01R 31/06
See application file for complete search history.

(56) References Cited

U.S. PATENT DOCUMENTS

| | | | | |
|---|---|---|---|---|
| 2013/0249777 | A1* | 9/2013 | Olsson | H01R 13/562 345/8 |
| 2016/0291666 | A1* | 10/2016 | Hosoya | G06F 1/163 |
| 2019/0339528 | A1* | 11/2019 | Freeman | G09G 3/002 |

FOREIGN PATENT DOCUMENTS

| | | |
|---|---|---|
| JP | H09-304729 A | 11/1997 |
| JP | 2013-230378 A | 11/2013 |

\* cited by examiner

*Primary Examiner* — Antonio A Caschera
(74) *Attorney, Agent, or Firm* — Oliff PLC

(57) ABSTRACT

A relay apparatus for coupling a head-mounted display apparatus to a first external device includes a substrate, a first cable including a plurality of first thin wires, the first cable extending in a first direction and a second cable extending in a direction opposite the first direction. In the relay apparatus, the substrate includes a first surface, a second surface on a backside of the first surface, a first coupling portion to which the plurality of first thin wires are coupled, and a second coupling portion to which the second cable is coupled, the first coupling portion includes a first connector that is located on the first surface and to which a subset of the plurality of first thin wires is coupled, and a second connector that is located on the second surface and to which another subset of the plurality of first thin wires is coupled.

11 Claims, 11 Drawing Sheets

RELAY APPARATUS AND DISPLAY SYSTEM

The present application is based on, and claims priority from JP Application Serial Number 2018-182320, filed Sep. 27, 2018, the disclosure of which is hereby incorporated by reference herein in its entirety.

BACKGROUND

1. Technical Field

The present disclosure relates to a relay apparatus and a display system.

2. Related Art

Head-mounted display apparatuses (so-called head-mounted displays (HMDs)) are known which are worn by a user on the head during use and configured to display images to be visually recognizable by the user. As such head-mounted displays, a head-mounted display including an optical visual body, a first remote controller, and a second remote controller is known (for example, see JP-A-9-304729).

In the head-mounted display described in JP-A-9-304729, the optical visual body includes a mounting portion to be worn on the head of a viewer, and a display unit suspended from the front part of the mounting portion to be positioned in front of the eyes of the viewer. The first remote controller includes various switches to be operated by the viewer, and the second remote controller includes a battery and a power supply circuit, a video signal processing circuit configured to process video signals input from an AV coupling cable to supply the video signals to a display control circuit, an audio signal processing circuit configured to process audio signals input from the AV coupling cable to supply the audio signals to a headphone coupling terminal, and the display control circuit configured to control an LCD drive unit in the display unit.

Among these, the first remote controller further includes a transfer path used for transfer of signals sent from the second remote controller.

However, for the head-mounted display described in JP-A-9-304729, when the first remote controller and the second remote controller are put on by the viewer during use, in a case in which the first remote controller and the second remote controller are large in size, a problem of difficulty in handling these controllers arises. Therefore, a more compact configuration is required for the sake of coupling to an optical visual body.

SUMMARY

A relay apparatus according to a first aspect of the present disclosure is a relay apparatus for coupling a head-mounted display apparatus to a first external device, including, a substrate, a first cable including a plurality of first thin wires and extending in a first direction as viewed from a normal direction of the substrate, and a second cable extending in a direction opposite the first direction. In the relay apparatus, the substrate includes a first surface, a second surface on a back side of the first surface, a first coupling portion to which the plurality of first thin wires are coupled, and a second coupling portion to which the second cable is coupled, the first coupling portion includes a first connector that is located on the first surface and to which a subset of the plurality of first thin wires is coupled, and a second connector that is located on the second surface and to which another subset of the plurality of first thin wires is coupled, one of the first cable and the second cable is coupled to the head-mounted display apparatus, and the other of the first cable and the second cable is coupled to the first external device.

In the first aspect, the second cable may include a plurality of second thin wires, and the number of the plurality of first thin wires may be greater than the number of the plurality of second thin wires.

In the first aspect, the second coupling portion may include a third connector that is located on the first surface to which a subset of the plurality of second thin wires is coupled, and a fourth connector that is located on the second surface and to which another subset of the plurality of second thin wires is coupled.

In the first aspect, the substrate may include a third coupling portion that is provided on a site of the substrate on an opposite side to the first direction and into which a third cable, coupled to a second external device, is removably insertable.

A relay apparatus according to a second aspect of the present disclosure is a relay apparatus for coupling a head-mounted display apparatus to a first external device, including a substrate, and a first cable including a plurality of first thin wires and extending in a first direction as viewed from a normal direction of the substrate. In the relay apparatus, the substrate includes a first surface, a second surface on a back side of the first surface, a first coupling portion that is located on the first direction side and to which the plurality of first thin wires are coupled, and a second coupling portion that is located on an opposite side to the first direction side and to which a second cable is couplable, the first coupling portion includes a first connector that is located on the first surface and to which a subset of the plurality of first thin wires is coupled, and a second connector that is located on the second surface and to which another subset of the plurality of first thin wires is coupled, one of the first cable and the second cable is coupled to the head-mounted display apparatus, and the other of the first cable and the second cable is coupled to the first external device.

In the above-described aspects, the first coupling portion may be provided on a site of the substrate on the first direction side, and the second coupling portion may be provided on a site of the substrate on an opposite side to the first direction side.

In the above-described aspects, the relay apparatus may include an external coupling terminal that is provided on the site of the substrate on the first direction side and into which a cable terminal is removably insertable for inputting and outputting a signal.

In the above-described aspects, the external coupling terminal may be provided on the first surface, and out of the plurality of first thin wires, the number of the first thin wires coupled to the first connector may be smaller than the number of the first thin wires coupled to the second connector.

In the above-described aspects, the relay apparatus may include a housing configured to accommodate the substrate, the housing may include an outer surface portion intersecting an extension direction of the first cable, a first opening located at the outer surface portion, the first cable being inserted through the first opening, and a second opening located at the outer surface portion and configured to expose the external coupling terminal, and the second opening may be positioned substantially centrally at the outer surface portion, in a direction from the second surface toward the first surface of the substrate.

In the above-described aspects, the first connector may include a first coupling surface extending along a direction intersecting the first direction as viewed from a normal direction of the first surface, the subset of the plurality of first thin wires being coupled to the first coupling surface, and the second connector may include a second coupling surface extending along a direction intersecting the first direction as viewed from a normal direction of the second surface, the other subset of the plurality of first thin wires being coupled to the second coupling surface.

In the above-described aspects, the relay apparatus may include an image processing circuit provided on the substrate and configured to process image information input from the first external device via the other of the first cable and the second cable to output the processed image information to the head-mounted display apparatus via the one of the first cable and the second cable.

In the above-described aspects, the first cable may be coupled to the head-mounted display apparatus.

A display system according to a third aspect of the present disclosure includes a head-mounted display apparatus and the relay apparatus described above.

DESCRIPTION OF EXEMPLARY EMBODIMENTS

First Embodiment

First Embodiment of the present disclosure will be described below with reference to the drawings.

Configuration of Display System

Figure 1:
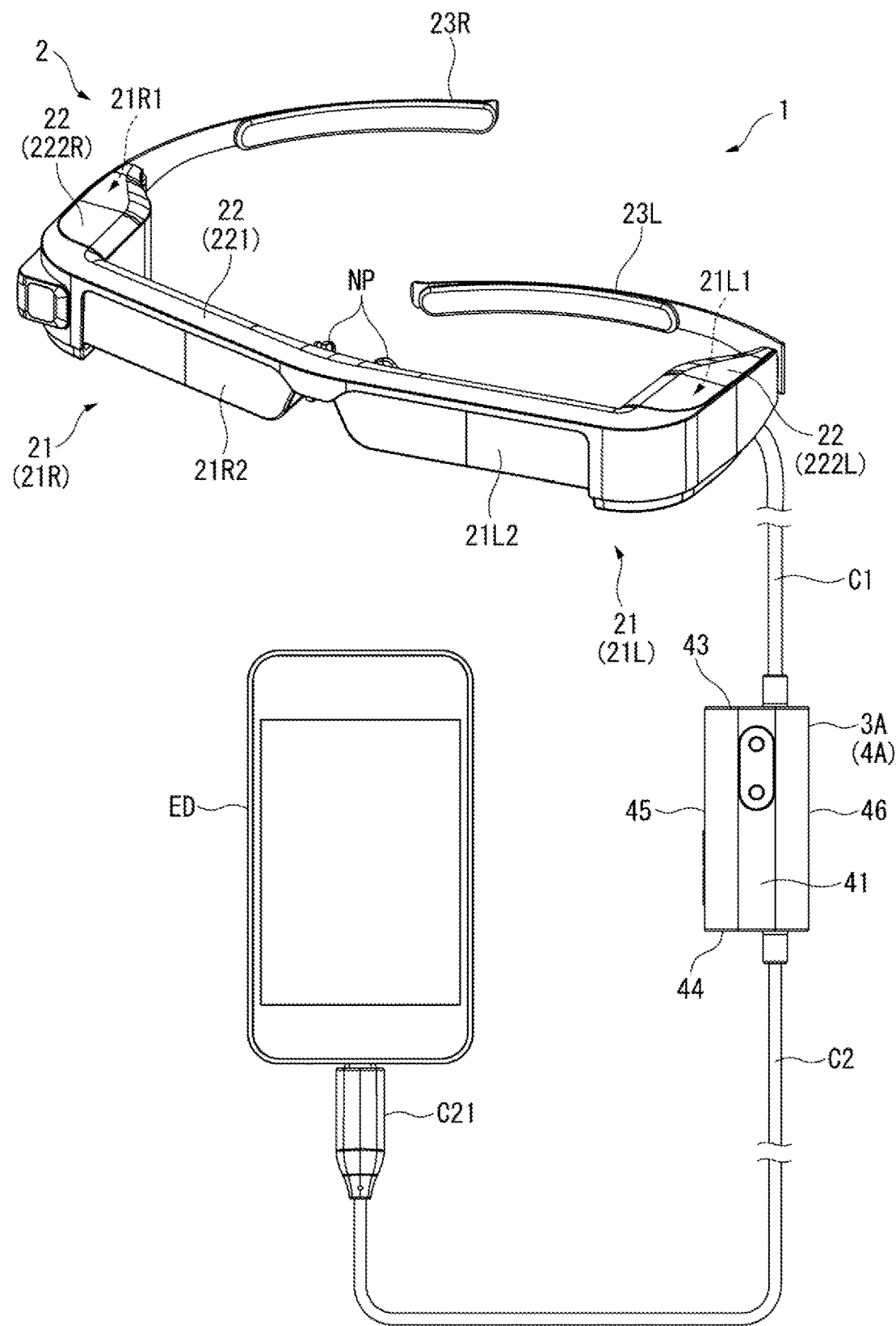
FIG. 1 is a schematic view illustrating a configuration of a display system according to First Embodiment of the present disclosure.

FIG. 1 is a schematic view illustrating a configuration of a display system 1 according to the embodiment.

As illustrated in FIG. 1, the display system 1 according to the embodiment includes a head-mounted display apparatus 2, and a relay apparatus 3A to be coupled to the head-mounted display apparatus 2 and an external device ED. In the display system 1, the relay apparatus 3A processes image information input from the external device ED being a first external device, the relay apparatus 3A outputs, to the head-mounted display apparatus 2, image signals based on the processed image information to display an image on the head-mounted display apparatus 2.

Hereinafter, the configuration of the display system 1 will be described in detail.

Note that a smartphone is illustrated as the external device ED in the embodiment, but the external device ED is not limited thereto, and another device or instrument that can output image information to the relay apparatus 3A may be used.

Configuration of Head-mounted Display Apparatus

The head-mounted display apparatus 2 is worn by a user on the head during use, and displays images based on image signals input from the relay apparatus 3A to be visually recognizable by the user.

The head-mounted display apparatus 2 includes display units 21, a support portion 22, temples 23L and 23R, and nose pads NP.

The display unit 21 is configured to emit, to predetermined viewing positions, image light based on input image signals to display an image formed from the emitted image light. The predetermined viewing positions are positions of an exit pupil formed by an optical system included in the display unit 21. In the embodiment, the predetermined viewing positions are set at virtual positions corresponding to the left eye and the right eye of the user.

Then, the display unit 21 includes a left display unit 21L configured to emit, to the left eye of a user that is one of the viewing positions, image light for the left eye to display an image for the left eye, and a right display unit 21R configured to emit, to the right eye of the user that is the other of the viewing positions, image light for the right eye to display an image for the right eye.

The left display unit 21L is positioned on the left of the user wearing the head-mounted display apparatus 2. The left display unit 21L includes a left emitting unit 21L1 being an image emitting unit configured to emit image light for the left eye for forming an image for the left eye, and a left light-guiding unit 21L2 configured to guide, to the left eye of the user, the image light for the left eye emitted from the left emitting unit 21L1 in order to display the image for the left eye such that the image for the left eye is visually recognizable by the left eye. The left emitting unit 21L1 is accommodated in a left housing 222L forming the support portion 22, and the left light-guiding unit 21L2 is disposed according to the position of the left eye of the user.

The right display unit 21R is positioned on the right of the user wearing the head-mounted display apparatus 2. The right display unit 21R includes a right emitting unit 21R1 being an image emitting unit configured to emit image light for the right eye for forming an image for the right eye, and a right light-guiding unit 21R2 configured to guide, to the right eye of the user, the image light for the right eye emitted from the right emitting unit 21R1 in order to display the image for the right eye such that the image for the right eye is visually recognizable by the right eye. The right emitting unit 21R1 is accommodated in a right housing 222R forming the support portion 22, and the right light-guiding unit 21R2 is disposed according to the position of the right eye of the user.

The support portion 22 is configured to support the display units 21 and the temples 23L and 23R. The support portion 22 includes a frame 221, the left housing 222L, and the right housing 222R.

The frame 221 is a metal member extending in the left and right directions in relation to the user, and configured to support the left light-guiding unit 21L2, the right light-guiding unit 21R2, and the nose pads NP. Note that the nose pads NP are disposed between the left light-guiding unit 21L2 and the right light-guiding unit 21R2.

The left housing 222L is secured to the left end of the frame 221 and accommodates the left emitting unit 21L1 therein.

The right housing 222R is secured to the right end of the frame 221 and accommodates the right emitting unit 21R1 therein.

Note that a first cable C1 extends from the left housing 222L, and, by the first cable C1, the relay apparatus 3A is coupled with the head-mounted display apparatus 2.

The temple 23L is pivotably supported at the rear end of the left housing 222L, and the temple 23R is pivotably supported at the rear end of the right housing 222R. When the head-mounted display apparatus 2 is mounted on the head of the user, the temples 23L and 23R are hooked on the left and right ears of the user, respectively, and the nose pads NP are in contact with the nose of the user.

Configuration of Relay Apparatus

Figure 2:
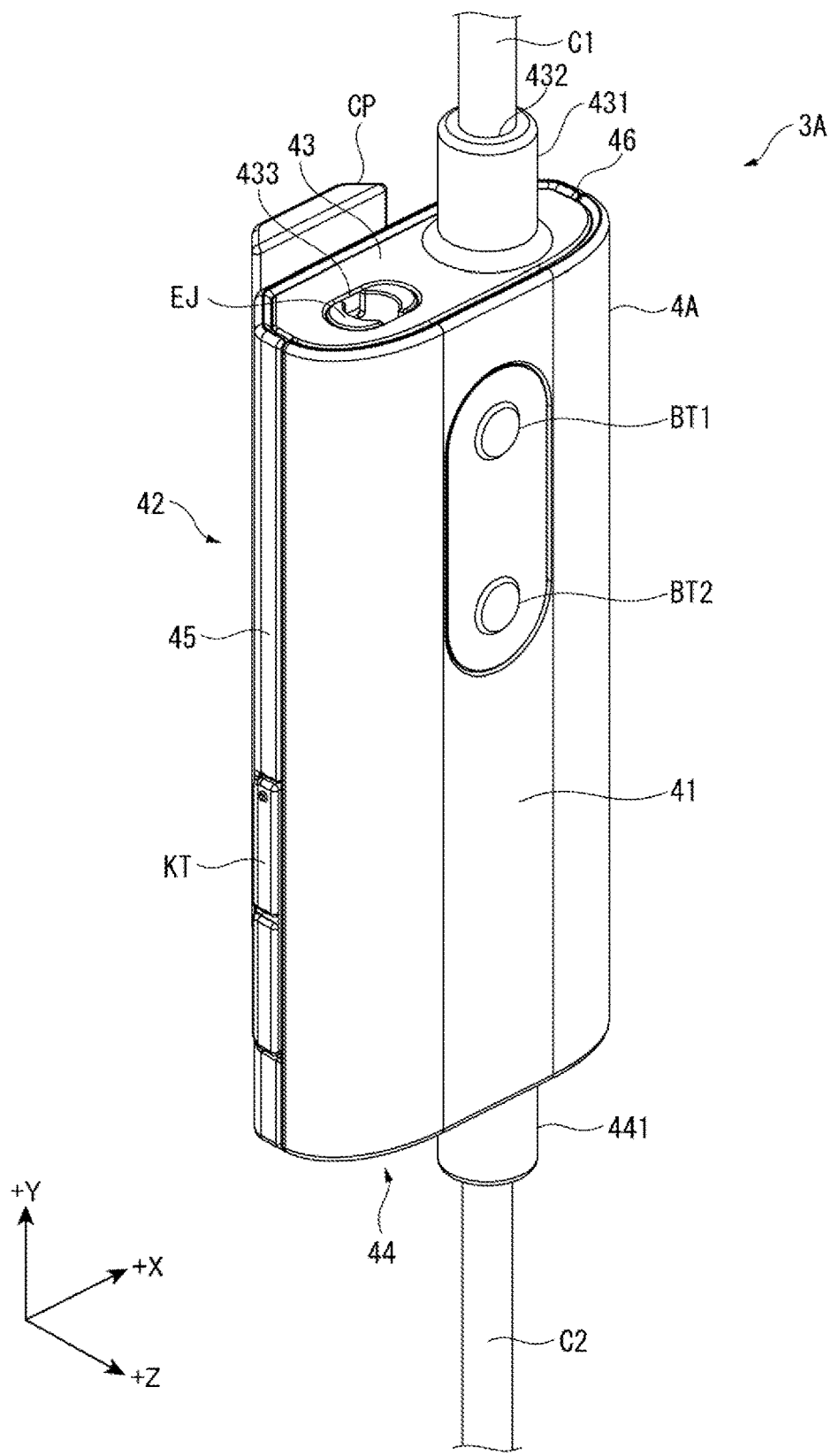
FIG. 2 is a perspective top front view of a relay apparatus according to First Embodiment.
Figure 3:
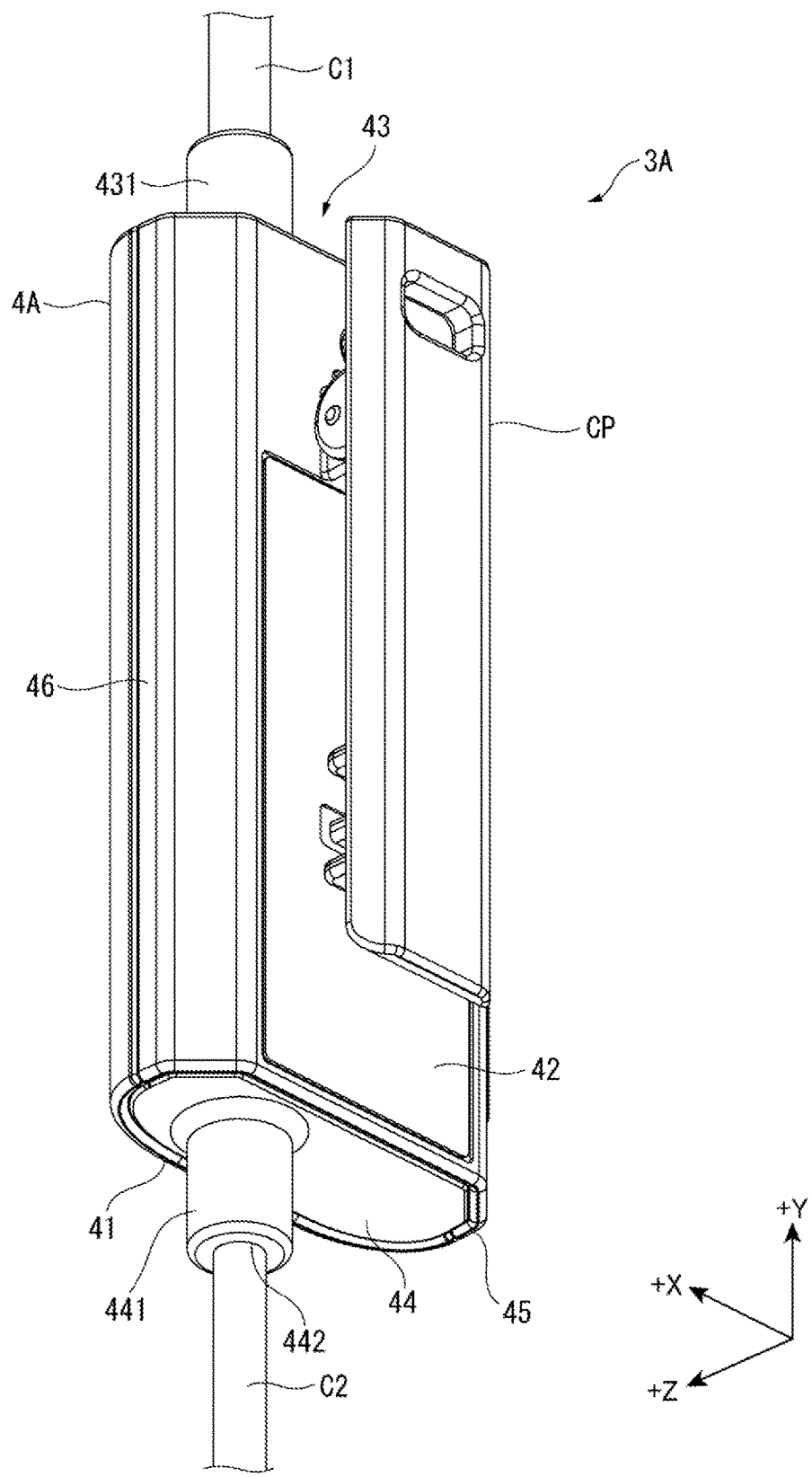
FIG. 3 is a perspective bottom rear view of the relay apparatus according to First Embodiment.

FIG. 2 is a perspective top front view of the relay apparatus 3A, and FIG. 3 is a perspective bottom rear view of the relay apparatus 3A.

The relay apparatus 3A is coupled with the head-mounted display apparatus 2 and the external device ED and performs relay operation between the head-mounted display apparatus 2 and the external device ED. In the relay operation, the relay apparatus 3A outputs electrical signals output from one of the head-mounted display apparatus 2 and the external device ED to the other. In the embodiment, the relay apparatus 3A is configured to, for example, process and amplify image signals and audio signals output from the external device ED, and output the processed and amplified signals to the head-mounted display apparatus 2.

As illustrated in FIGS. 2 and 3, the relay apparatus 3A includes a housing 4A, the first cable C1 coupled to the head-mounted display apparatus 2, and a second cable C2 coupled to the external device ED.

Configuration of Housing

The housing 4A includes a front surface portion 41, a rear surface portion 42, a top surface portion 43, a bottom surface portion 44, a left side surface portion 45, and a right sides surface portion 46, and generally has an overall shape of an elliptical column.

In the following description, +Z direction is a direction from the rear surface portion 42 to the front surface portion 41, +Y direction is a direction from the bottom surface portion 44 to the top surface portion 43, and +X direction is a direction from the left side surface portion 45 to the right side surface portion 46. The +X direction, the +Y direction, and the +Z direction are perpendicular to each other. Further, for the convenience of explanation, opposite directions to the +X, +Y, and +Z directions are defined as −X, −Y, and −Z directions, respectively (not illustrated).

As illustrated in FIG. 2, the front surface portion 41 includes buttons BT1 and BT2 disposed side by side in the +Y direction. The buttons BT1 and BT2 are buttons for volume adjustment and configured to receive an operation for increasing or decreasing the signal level of audio signals to be supplied to an earphone jack EJ opening in the top surface portion 43.

The buttons BT1 and BT2 are membrane switches and are provided on flexible printed circuits FPC (see FIG. 6) to be coupled to a substrate 5A located in the housing 4A. However, the buttons BT1 and BT2 may be push switches, or a touch panel may be provided in place of the buttons BT1 and BT2. The buttons BT1 and BT2 may be buttons for receiving an operation for operating another function different from volume adjustment.

A holding unit 431 is included in a part of the top surface portion 43 on a +X direction side. The holding unit 431 is configured to hold the first cable C1 coupled to the head-mounted display apparatus 2. The first cable C1 is inserted through a first opening 432 penetrating the holding unit 431 in the +Y direction, and extends in the +Y direction toward the outside of the housing 4A. In other words, the top surface portion 43 corresponds to an outer surface portion of the housing 4A located on an extension direction side in relation to the first cable C1. Further, a second opening 433 for exposing the earphone jack EJ is included in a part of the top surface portion 43 on a −X direction side. In the top surface portion 43, the second opening 433 is positioned substantially centrally in the +Z direction. Note that the +Z direction is also a direction from a second surface 5A2 to a first surface 5A1 of the substrate 5A out of the below-described first surface 5A1 and the second surface 5A2.

Key tops KT configured to press push switches 53 and 54 (see FIG. 4) provided on the substrate 5A are provided in the left side surface portion 45. Note that the function of the key tops KT and the push switches 53 and 54 and the function of the buttons BT1 and BT2 may be reversed.

As illustrated in FIG. 3, the rear surface portion 42 is provided with a clip CP for holding the relay apparatus 3A on a clothing or the like of the user.

A holding unit 441 is included in a part of the bottom surface portion 44 on the +X direction side. The holding unit 441 is configured to hold the second cable C2 that can be coupled to the external device ED. The second cable C2 is inserted though the opening 442 penetrating the holding unit 441 in the +Y direction, and extends in the −Y direction toward the outside of the housing 4A. Note that, a cable terminal C21 to be inserted into the external device ED is provided at an end of the second cable C2, as illustrated in FIG. 1. Note that in the embodiment, the second cable C2 is a USB cable and the cable terminal C21 is a Universal Serial Bus (USB) Type-C terminal. However, the cable terminal C21 is not limited thereto, and may be another type of USB terminal such as a micro USB terminal and a mini USB terminal. The second cable C2 may be another video input cable for DisplayPort or High-Definition Multimedia Interface (Registered trademark: HDMI), for example. Note that, a direction of a line connecting the holding units 431 and 441 is parallel to the +Y direction. In other words, the central axis of the first cable C1 which is inserted through the holding unit 431 and extended toward the outside of the housing 4A, and the central axis of the second cable C2 which is inserted through the holding unit 441 and extended toward the outside of the housing 4A are both parallel to the Y direction and are both positioned on the same straight line parallel to the +Y direction.

Internal Configuration of Relay Apparatus

Figure 4:
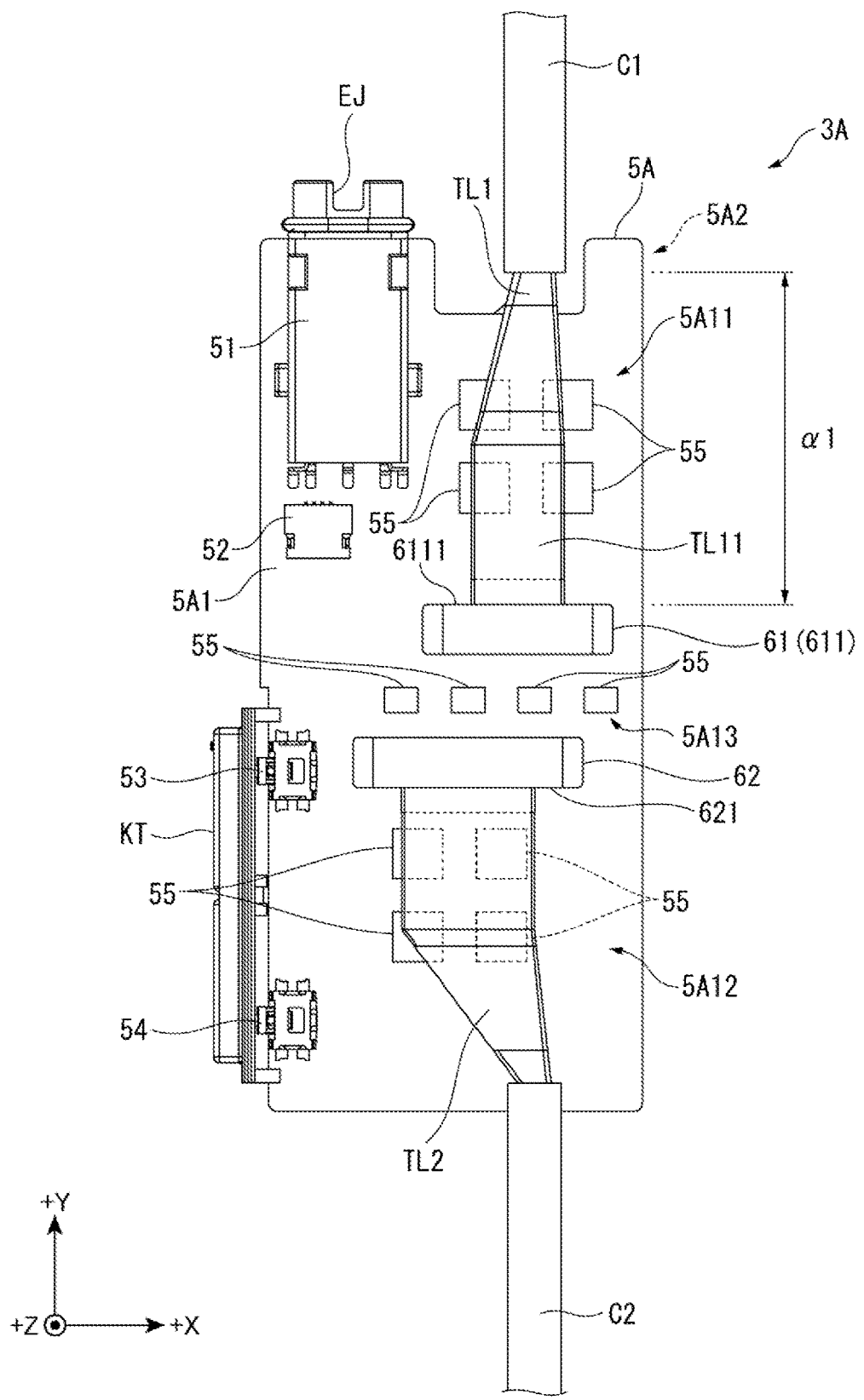
FIG. 4 is a front view of the relay apparatus according to First Embodiment with a housing removed.
Figure 5:
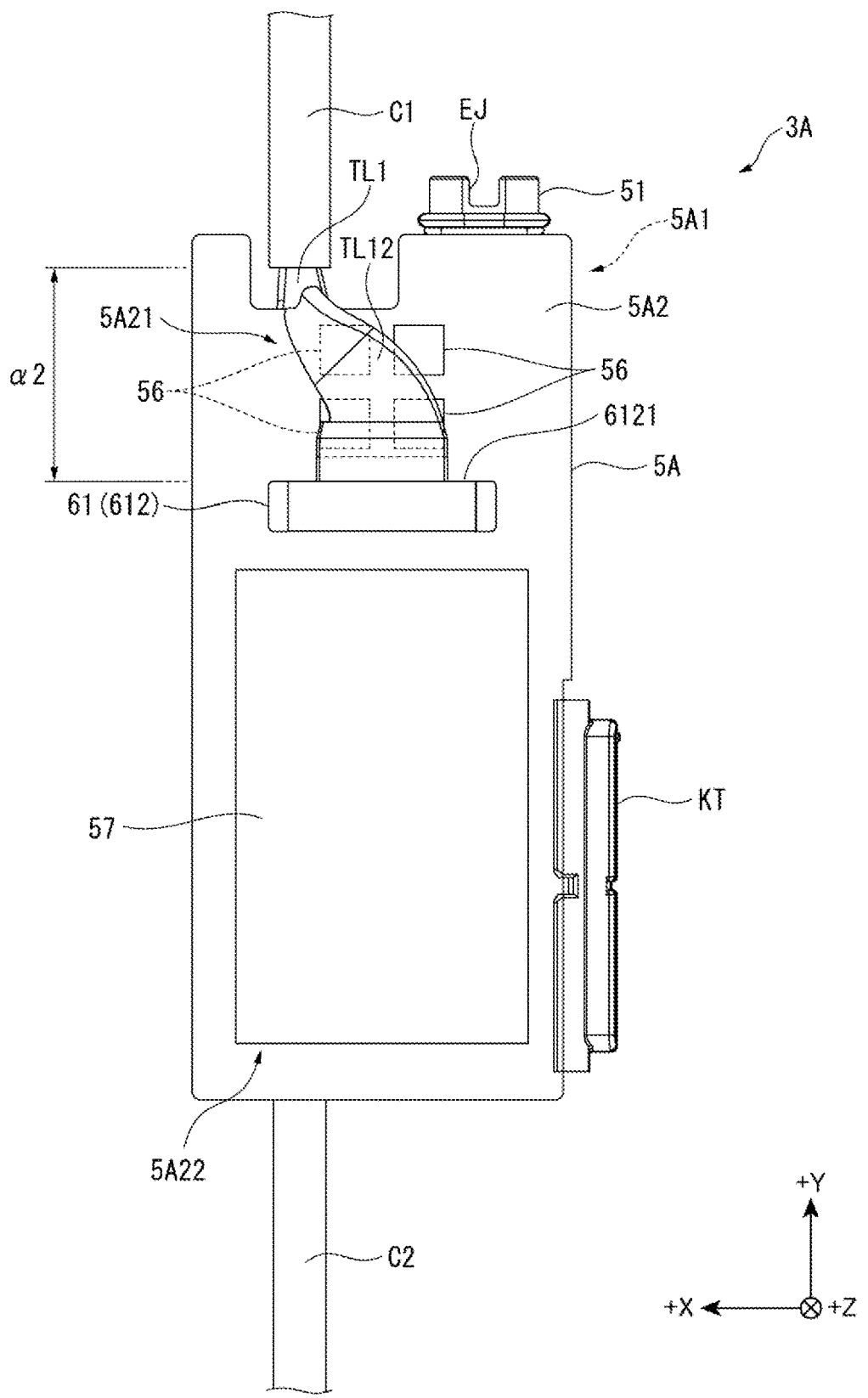
FIG. 5 is a rear view of the relay apparatus according to First Embodiment with the housing removed.

FIGS. 4 and 5 are front and rear views, respectively, of the relay apparatus 3A with the housing 4A removed. In other words, FIG. 4 is a plan view of the substrate 5A to be accommodated in the housing 4A as viewed from the +Z direction being the normal direction of the first surface 5A1 of the substrate 5A, and FIG. 5 is a plan view of the substrate 5A as viewed from the −Z direction being the normal direction of the second surface 5A2 of the substrate 5A.

The relay apparatus 3A includes the substrate 5A disposed within the housing 4A, as illustrated in FIGS. 4 and 5.

The substrate 5A is a substantially rectangular rigid substrate that is long in the +Y direction and is disposed along the XY plane. The substrate 5A includes a first surface 5A1, which is a +Z side surface, and a second surface 5A2, which is a −Z side surface and an opposite surface to the first surface 5A1. The first surface 5A1 and the second surface 5A2 are both mounting surfaces.

The substrate 5A includes an external coupling terminal 51, a coupling element 52, the push switches 53 and 54, a plurality of circuit elements 55, a plurality of circuit elements 56, and an image processing circuit 57, and a first coupling portion 61 and a second coupling portion 62, which are provided on the first surface 5A1 or the second surface 5A2.

The external coupling terminal 51, the coupling element 52, the push switches 53 and 54, and the plurality of circuit elements 55 are mounted on the first surface 5A1, as illustrated in FIG. 4.

The external coupling terminal 51 is a connector including the earphone jack EJ to which an earphone terminal being a cable terminal is removably insertable. The external coupling terminal 51 is provided at a corner of the first surface 5A1 positioned on a +Y direction side and on the −X direction side of the first surface 5A1 so that the opening of the earphone jack EJ faces in the +Y direction. Note that the external coupling terminal 51 is not limited to the connector having the earphone jack EJ to which an earphone terminal is removably insertable, and may be any connector that can be coupled with other external devices. In other words, the external coupling terminal 51 may not be a terminal that outputs audio signals, and may be any terminal to which a terminal of a cable coupled with another external device is removably insertable. For example, the external coupling terminal 51 may be a terminal for power supply from an external battery, or may be a terminal for receiving image signals from an image input device such as a camera. That is, the external coupling terminal 51 may have another coupling terminal such as a USB terminal, instead of or in addition to the earphone jack EJ.

Figure 6:
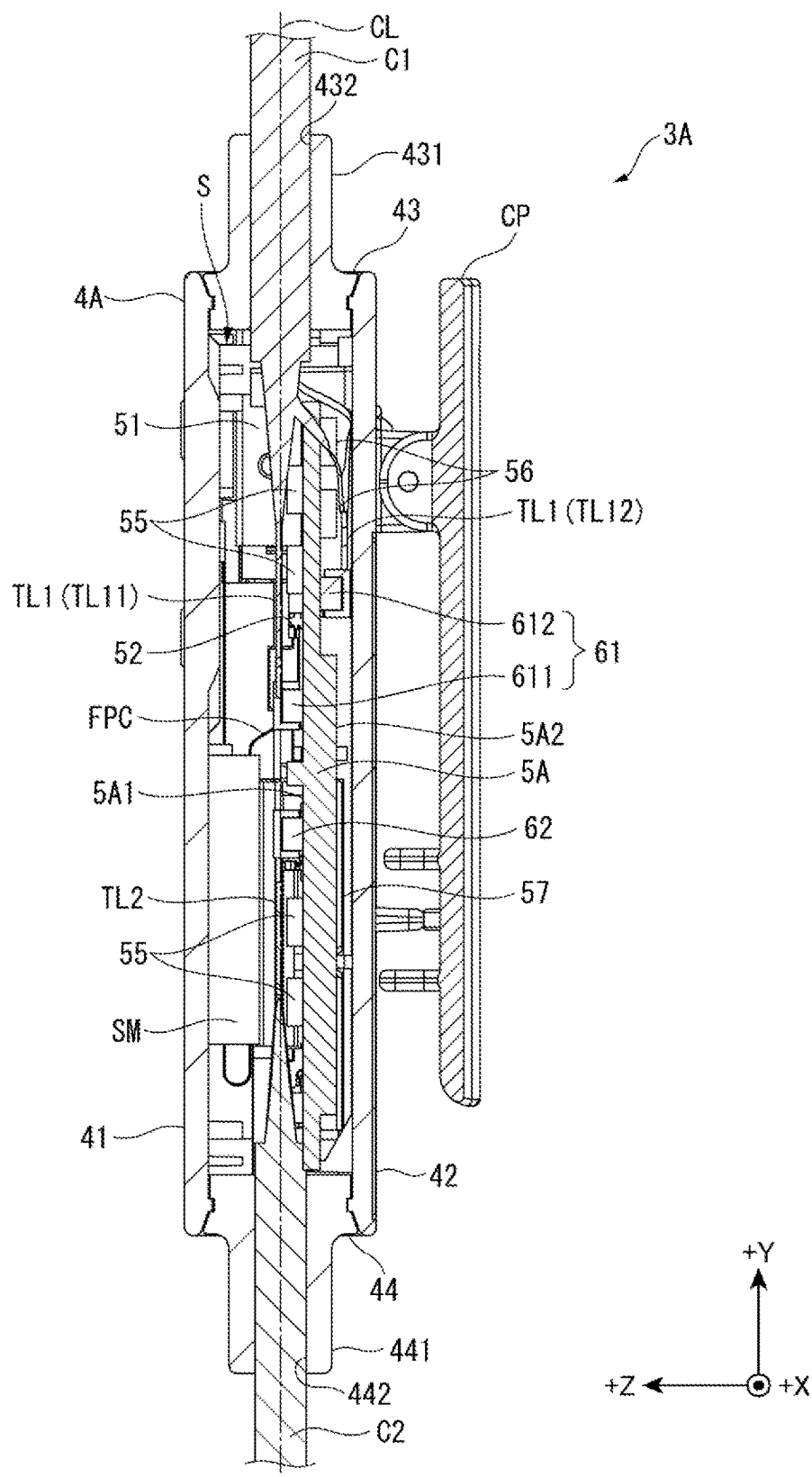
FIG. 6 is a cross-sectional view of the relay apparatus according to First Embodiment.

FIG. 6 illustrates a cross section of the relay apparatus 3A along the YZ plane, as viewed from the +X direction. Specifically, FIG. 6 illustrates a cross section of the relay apparatus 3A that is parallel to the YZ plane and includes the central axes of the cables C1 and C2, as viewed from the +X direction.

Here, as illustrated in FIG. 2, the earphone jack EJ is exposed outside by the second opening 433 positioned substantially centrally in the +Z direction in the top surface portion 43. In other words, the earphone jack EJ is positioned substantially centrally in the +Z direction in the top surface portion 43. In order to dispose the earphone jack EJ in this manner, the substrate 5A on which the external coupling terminals 51 are mounted is disposed at a position on the rear surface portion 42 side, i.e., in the −Z side, of a space S in the housing 4A, as illustrated in FIG. 6. In other words, the substrate 5A is positioned on a −Z direction side with respect to a center line CL that extending along the center between the inner side of the front surface portion 41 and the inner side of the rear surface portion 42 and is parallel to the +Y direction. This allows the earphone jack EJ to be positioned substantially centrally in the +Z direction in the top surface portion 43.

Note that a holding unit (not illustrated) configured to hold the substrate 5A is provided on an inner side of the housing 4A.

As illustrated in FIG. 4, the coupling element 52 is a connector mounted, on the first surface 5A1, at a position on the −Y side with respect to the external coupling terminal 51. The coupling element 52 is coupled to the flexible printed circuits FPC provided with the buttons BT1 and BT2.

The push switches 53 and 54 are arranged along an end edge of the first surface 5A1 in the −X direction. As described above, when a part of the key top KT on the +Y direction side is depressed, the push switch 53 is depressed and outputs a predetermined operation signal to the substrate 5A. When a part of the key top KT on a −Y direction side is depressed, the push switch 54 is depressed and outputs a predetermined operation signal to the substrate 5A.

On the first surface 5A1, the plurality of circuit elements 55 are provided in the region 5A11 on the +Y side, the region 5A12 on the −Y side, and the region 5A13 positioned centrally in the +Y direction.

Specifically, in a part of the region 5A11 on the +X direction side, two rows of the circuit elements 55, each including two circuit elements 55 arranged along the +X direction, are arranged along the +Y direction, and thus a total of four circuit elements 55 are mounted. Similarly, approximately in the center of the region 5A12, two rows of the circuit elements 55, each including two circuit elements 55 arranged along the +X direction, are arranged along the +Y direction, and thus a total of four circuit elements 55 are mounted. On the other hand, in the region 5A13 between the region 5A11 and the region 5A12, four circuit elements 55 are mounted along the +X direction.

As illustrated in FIG. 5, the plurality of circuit elements 56 are mounted in a region 5A21 that is the +Y side region of the second surface 5A2. Specifically, approximately in the center of the region 5A21, two rows of the circuit elements 56, each including two circuit elements 56 arranged along the +X direction, are arranged along the +Y direction, and thus a total of four circuit elements 56 are mounted.

Note that at least one circuit element of the plurality of circuit elements 55 and 56 is an audio processing circuit configured to process audio information input from the second cable C2. The audio processing circuit increases or decreases the signal level of audio signals to be supplied to the earphone jack EJ based on the audio information, in response to an operation signal input from the buttons BT1 and BT2.

The image processing circuit 57 is mounted in a region 5A22 that is the −Y side region of the second surface 5A2. The image processing circuit 57 is configured to process image information input from the second cable C2. For example, the image processing circuit 57 is configured to process the input image information to convert the processed information into image signals to be output to the head-mounted display apparatus 2. Specifically, based on the input image information, the image processing circuit 57 generates image signals to be output to the left emitting unit 21L1 of the left display unit 21L, i.e., image signals for the left eye for forming the image for the left eye, and generates image signals to be output to the right emitting unit 21R1 of the right display unit 21R, i.e., image signals for the right eye for forming the image for the right eye. The image processing circuit 57 outputs the generated image signals to the head-mounted display apparatus 2 via the first cable C1.

Configurations of First Cable and Second Cable

The first cable C1 includes a plurality of first thin wires TL1. The first cable C1 is formed by bundling the plurality of first thin wires TL1 together by a protective film being an insulator, and is coupled to the first coupling portion 61. As described above, the first cable C1 extends in the +Y direction from the top surface portion 43, and electrically couples the relay apparatus 3A to the head-mounted display apparatus 2. At the end of the first cable C1 on the relay apparatus 3A side, a plurality of first thin wires TL11 being a subset of the first thin wires TL1 included in the plurality of first thin wires TL1 are routed to the first surface 5A1 side, as illustrated in FIGS. 4 and 6, and a plurality of first thin wires TL12 being another subset of the first thin wires TL1 included in the plurality of first thin wires TL1, i.e., the rest of the first thin wires TL1, are routed to the second surface 5A2 side, as illustrated in FIGS. 5 and 6.

The second cable C2 includes a plurality of second thin wires TL2. The second cable C2 is a cable formed by bundling the plurality of second thin wires TL2 together by a protective film being an insulator, and is coupled to the second coupling portion 62. As described above, the second cable C2 extends in the −Y direction from the bottom surface portion 44, and electrically couples the relay apparatus 3A to the external device ED.

Configuration of Second Coupling Portion to be Coupled with Second Cable

First, the second coupling portion 62 will be described.

As illustrated in FIG. 4, the second coupling portion 62 is a connector mounted on a part of the first surface 5A1 on the −Y direction side, and coupled to the plurality of second thin wires TL2 included in the second cable C2. Specifically, the second coupling portion 62 is disposed between the region 5A12 and the region 5A13 on the first surface 5A1 such that the coupling surface 621 coupled with the plurality of second thin wires TL2 extends along the +X direction intersecting the +Y direction being the first direction, and faces in the −Y direction. In other words, the longitudinal direction of the second coupling portion 62 is along the +X direction.

Thus, the plurality of second thin wires TL2 coupled to the second coupling portion 62 cover, in the +Z direction, the plurality of circuit elements 55 mounted in the region 5A12.

Note that, an elastic member SM is provided between the plurality of second thin wires TL2 coupled to the second coupling portion 62 and the inner side of the front surface portion 41, as illustrated in FIG. 6.

Configuration of First Coupling Portion to be Coupled with First Cable

The first coupling portion 61 is coupled to the first cable C1. The first coupling portion 61 includes a first connector 611 and a second connector 612. The first connector 611 is provided at a +X side position in a part of the first surface 5A1 on the +Y direction side, as illustrated in FIG. 4. The second connector 612 is provided in a part of the second surface 5A2 on the +Y direction side, as illustrated in FIG. 5. In other words, in relation to the second coupling portion 62, the first coupling portion 61 is provided in a site of the substrate 5A on the +Y direction side.

Specifically, the first connector 611 is mounted between the region 5A11 and the region 5A13 on the first surface 5A1 such that a first coupling surface 6111 coupled to the plurality of first thin wires TL11 routed to the first surface 5A1 side extends along the +X direction intersecting the +Y direction being the first direction, and faces in the +Y direction. In other words, the first connector 611 includes the first coupling surface 6111 that extends in the +X direction, as viewed from the +Z direction being the normal direction of the first surface 5A1, and is coupled with the plurality of first thin wires TL11. The plurality of first thin wires TL11 coupled to the first coupling surface 6111 cover, in the +Z direction, the plurality of circuit elements 55 mounted in the region 5A11.

As illustrated in FIG. 5, the second connector 612 is mounted between the region 5A21 and the region 5A22 on the second surface 5A2 such that a second coupling surface 6121 coupled to the plurality of first thin wires TL12 routed to the second surface 5A2 side extends along the +X direction intersecting the +Y direction being the first direction, and faces in the +Y direction. In other words, the second connector 612 includes the second coupling surface 6121 that extends in the +X direction, as viewed from the −Z direction being the normal direction of the second surface 5A2, and is coupled with the plurality of first thin wires TL12. The plurality of first thin wires TL12 coupled to the second coupling surface 6121 cover, in the −Z direction, the plurality of circuit elements 56 mounted in the region 5A21.

Note that, in the embodiment, the number of the plurality of first thin wires TL11 coupled to the first connector 611 is smaller than the number of the plurality of first thin wires TL12 coupled to the second connector 612. This is because, in the vicinity of the position for mounting the first connector 611 on the first surface 5A1, the external coupling terminal 51 is mounted, and thus there is no space for disposing the large first connector 611 on the first surface 5A1.

Thus, it becomes possible to dispose the first connector 611 on the first surface 5A1 by making the number of the first thin wires TL11 coupled to the first connector smaller than the number of the first thing wires TL12 coupled to the second connector, thereby employing a smaller first connector 611.

However, other configurations may be allowed, and thus, for example, the number of the plurality of first thin wires TL11 coupled to the first connector 611 may be equal to or less than the number of the plurality of first thin wires TL12 coupled to the second connector 612.

As illustrated in FIG. 4, in the first cable C1, a dimension from an exposed portion of the first thin wires TL1 to the first connector 611 is defined as a dimension $\alpha 1$. Further, as illustrated in FIG. 5, in the first cable C1, a dimension from an exposed portion of the first thin wires TL1 to the second connector 612 is defined as a dimension $\alpha 2$. Here, the smaller of the dimensions $\alpha 1$ and $\alpha 2$ is 20 mm or greater. In the embodiment, the dimension $\alpha 1$ is greater than the dimension $\alpha 2$, and thus the dimension $\alpha 2$ is 20 mm or greater. This is the dimension required to couple the plurality of first thin wires TL1 included in the first cable C1 to the connectors 611 or 612.

The number of the plurality of first thin wires TL1 included in the first cable C1 is greater than the number of the plurality of second thin wires TL2 included in the second cable C2.

Here, a configuration in which the second connector 612 is not provided and all of the first thin wires TL1 are coupled to the first connector 611 is described. In this configuration, a dimension of the first connectors 611 in a direction along which the first thin wires TL1 are arranged is greater than a dimension of the second coupling portion 62, to which all of the second thin wires TL2 are coupled, in a direction along which the second thin wires TL2 are arranged. Thus, when each of the first connector 611 and the second coupling portion 62 is disposed along the +X direction on the first surface 5A1, the dimension of the substrate 5A in the +X direction increases, and thus the size of the relay apparatus increases.

In contrast, in the embodiment, out of the plurality of first thin wires TL1, the plurality of first thin wires TL11 being a subset of the first thin wires TL1 are routed to the first surface 5A1 side, the plurality of first thin wires TL12 being the rest of the first thin wires TL1 are routed to the second surface 5A2 side, the plurality of first thin wires TL11 are coupled to the first connector 611, and the plurality of first thin wires TL12 are coupled to the second connector 612. As a result, the dimensions of the substrate 5A in the +X direction can be reduced, and thus the size of the relay apparatus 3A can be reduced.

Effects of First Embodiment

The following effects can be achieved according to the relay apparatus 3A and the display system 1 of the embodiment described above.

The display system 1 includes the head-mounted display apparatus 2 to be worn by a user on the head, and the relay apparatus 3A. The relay apparatus 3A is configured to couple the head-mounted display apparatus 2 to the external device ED being the first external device. The relay apparatus 3A includes the substrate 5A, the first cable C1, and the second cable C2. The first cable C1 includes the plurality of first thin wires TL1 and extends in the +Y direction being the first direction as viewed from the +Z direction being the normal direction of the substrate 5A. The second cable C2 extends in the −Y direction being the direction opposite to the first direction. The substrate 5A includes the first surface 5A1, the second surface 5A2 that is a surface opposite to the first surface 5A1, the first coupling portion 61 to which the plurality of first thin wires TL1 are coupled, and the second coupling portion 62 to which the second cable C2 is coupled. The first coupling portion 61 includes the first connector 611 and the second connector 612. The first connector 611 is positioned on the first surface 5A1 and coupled with the plurality of first thin wires TL11 that is a subset of the plurality of first thin wires TL1. The second connector 612 is positioned on the second surface 5A2 and coupled with the plurality of first thin wires TL12 that is another subset of the plurality of first thin wires TL1. Further, the first cable C1 is coupled to the head-mounted display apparatus 2, and the second cable C2 is coupled to the external device ED.

With the configuration, as described above, the dimension of the substrate 5A in the +X direction can be reduced. Accordingly, the size of the relay apparatus 3A can be reduced.

The second cable C2 includes the plurality of second thin wires TL2. The number of the plurality of first thin wires TL1 is greater than the number of the plurality of second thin wires TL2.

As a result, the number of the first thin wires TL1 coupled to the first coupling portion 61 is greater than the number of the second thin wires TL2 coupled to the second coupling portion 62. Accordingly, the first thin wires TL1 are divided into the subset coupled to the first connector 611 and the other subset coupled to the second connector 612 to effectively reduce the dimension of the substrate 5A in the +X direction.

The first coupling portion 61 is provided in a site of the substrate 5A on the +Y direction side being a first direction side. The second coupling portion 62 is provided in a site of the substrate 5A on the −Y direction side being an opposite side to the first direction side.

As a result, it is possible to easily achieve the coupling of the first thin wires TL1 included in the first cable C1 to the first coupling portion 61 and the coupling of the second thin wires TL2 included in the second cable C2 to the second coupling portion 62. In addition, the dimension of the substrate 5A in the +X direction can be reduced as compared to when the first connector 611 and the second coupling portion 62 are arranged side by side in the +X direction with the first coupling surface 6111 facing in the +Y direction and the coupling surface 621 facing in the −Y direction.

The relay apparatus 3A includes the external coupling terminal 51 provided on the site of the substrate 5A on the +Y direction side being the first direction side. The external coupling terminal 51 is configured such that the earphone terminal, which is the cable terminal, is removably insertable to the external coupling terminal 51 for inputting and outputting a signal.

As a result, in addition to outputting image signals to the head-mounted display apparatus 2, the relay apparatus 3A can also output audio signals to the earphone coupled therewith, and thus it is possible to enhance the versatility of the relay apparatus 3A.

The external coupling terminal 51 is provided on the first surface 5A1, and out of the plurality of first thin wires TL1, the number of the first thin wires TL11 coupled to the first connector 611 is smaller than the number of the first thin wires TL12 coupled to the second connector 612 positioned on the second surface 5A2.

As a result, the first connector 611 positioned on the first surface 5A1 on which the external coupling terminal 51 is provided can be smaller than the second connector 612. Therefore, even when the external coupling terminal 51 is provided, the first connector 611 can be disposed on the first surface 5A1, and the size of the substrate 5A can be reduced.

The relay apparatus 3A includes the housing 4A configured to accommodate the substrate 5A. The housing 4A includes the top surface portion 43 being the outer surface portion intersecting the extension direction of the first cable C1, the first opening 432 positioned in the top surface portion 43, through which the first cable C1 is inserted, and the second opening 433 positioned in the top surface portion 43 and to expose the earphone jack EJ of the external coupling terminal 51. In the top surface portion 43, the second opening 433 is substantially centrally positioned in the +Z direction being a direction from the second surface 5A2 of the substrate 5A toward the first surface aA1.

As a result, the second opening 433 for exposing the earphone jack EJ is positioned, in the top surface portion 43, substantially centrally in the +Z direction, and thus the appearance of the relay apparatus 3A can be better. In addition, since the earphone terminal can be easily inserted into the second opening 433, the easy-to-use relay apparatus 3A can be provided.

The first connector 611 includes the first coupling surface 6111 that extends along the +X direction intersecting the +Y direction being the first direction, as viewed from the +Z direction being the normal direction of the first surface 5A1. The first coupling surface 6111 is coupled with the plurality of first thin wires TL11 being a subset of the plurality of first thin wires TL1. In addition, the second connector 612 includes the second coupling surface 6121 that extends along the +X direction, as viewed from the −Z direction being the normal direction of the second surface 5A2. The second coupling surface 6121 is coupled with the plurality of first thin wires TL12 being another subset of the plurality of first thin wires TL1.

As a result, it is possible to easily achieve the coupling of the first thin wires TL11 to the first connector 611 and the coupling of the first thin wires TL12 to the second connector 612.

The relay apparatus 3A includes the image processing circuit 57 provided on the second surface 5A2 of the substrate 5A. The image processing circuit 57 is configured to process image information input from the external device ED via the second cable C2 to output image signals to the head-mounted display apparatus 2 via the first cable C1.

As a result, the relay apparatus 3A includes the image processing circuit 57, and thus processing load in the head-mounted display apparatus 2 can be reduced and the configuration of the head-mounted display apparatus 2 can be simplified.

Further, the image processing circuit 57 may be configured to generate image information for the left eye and image information for the right eye based on input image information and output the image information for the left eye and the image information for the right eye to the head-mounted display apparatus 2 via the first cable C1. As a result, the left display unit 21L and the right display unit 21R of the head-mounted display apparatus 2 can appropriately display the image for the right eye and the image for the left eye.

The first cable C1 is coupled to the head-mounted display apparatus 2.

As a result, the first cable C1 including a greater number of thin wires than that of the second cable C2 is coupled to the head-mounted display apparatus 2, and thus image signals for the right eye and image signals for the left eye can be individually output to the head-mounted display apparatus 2. Thus, the frame rates for images for the left eye and images for the right eye which are displayed by the head-mounted display apparatus 2 can be improved in comparison to a configuration in which image signals for the left eye and image signals for the right eye are output in a time division manner, for example.

First Modified Example of First Embodiment

In the relay apparatus 3A, the plurality of first thin wires TL1 included in the first cable C1 are coupled to the first connector 611 and the second connector 612, which are mounted on the first surface 5A1 and the second surface 5A2, respectively. On the other hand, the plurality of second thin wires TL2 included in the second cable C2 are coupled to the second coupling portion 62 being a single connector mounted to the first surface 5A1. However, other configurations may be allowed, and thus the second coupling portion may include a connector mounted on the first surface of the substrate and a connector mounted on the second surface of the substrate, and subsets of the plurality of second thin wires TL2 may be separately coupled to each connector.

Figure 7:
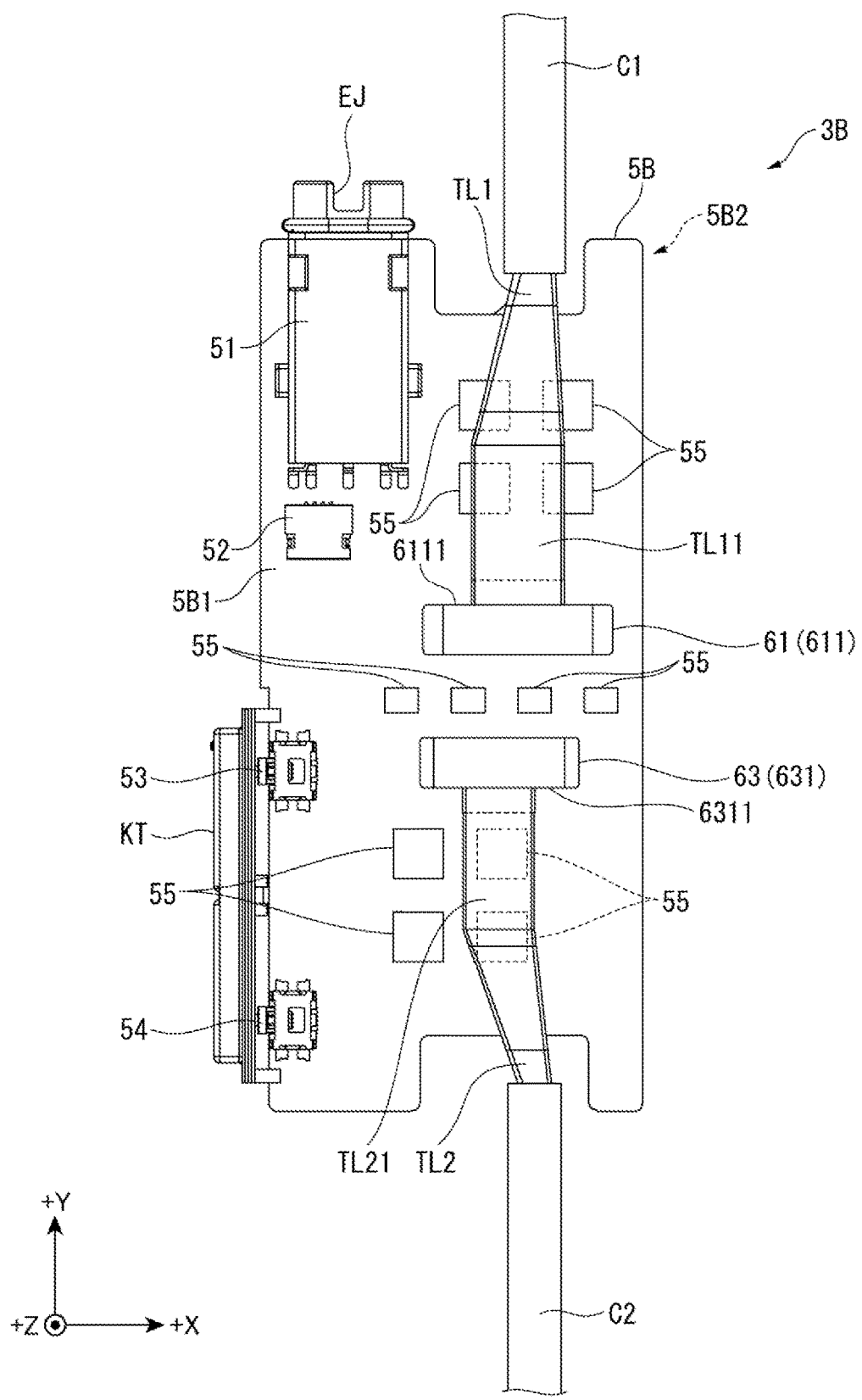
FIG. 7 is a front view of a substrate in a variation of the relay apparatus according to First Embodiment.
Figure 8:
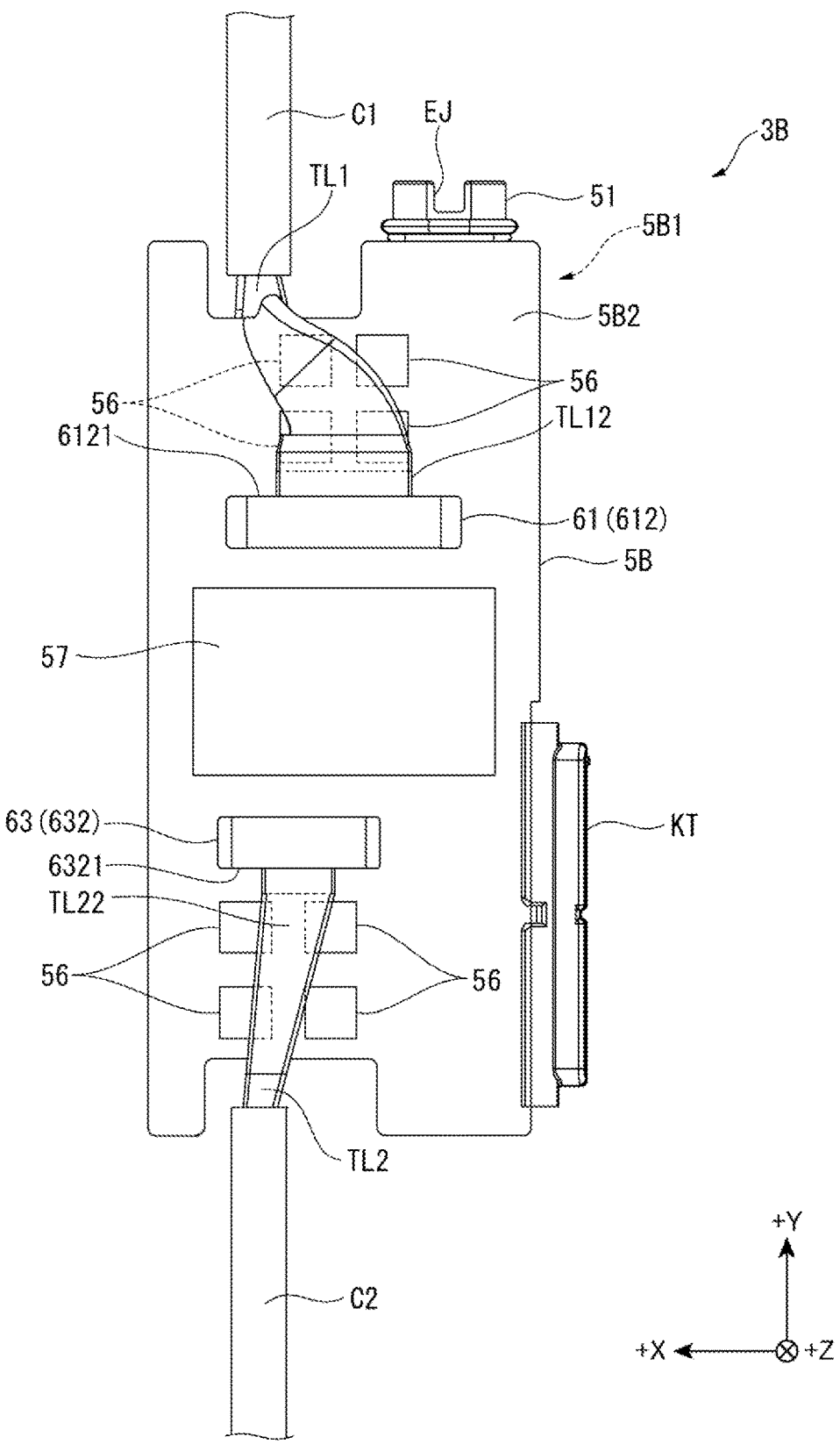
FIG. 8 is a rear view of the substrate in a variation of the relay apparatus according to First Embodiment.

FIGS. 7 and 8 are a front view and a rear view, respectively, of a substrate 5B included in a relay apparatus 3B that is a variation of the relay apparatus 3A. In other words, FIGS. 7 and 8 are plan views of the substrate 5B, as viewed from the +Z direction and from the −Z direction, respectively.

For example, the relay apparatus 3B illustrated in FIGS. 7 and 8 may be substituted for the relay apparatus 3A.

The relay apparatus 3B has the same configuration and functions as those of the relay apparatus 3A, except that the substrate 5B is included instead of the substrate 5A.

The substrate 5B has the same configuration and functions as those of the substrate 5A, except that a second coupling portion 63 is included instead of the second coupling portion 62.

The second coupling portion 63 includes a connector 631 and a connector 632. The connector 631 is a third connector provided on the first surface 5B1, which is the +Z side surface. The connector 632 is a fourth connector provided on the second surface 5B2, which is the −Z side surface and a surface opposite to the first surface 5B1.

As illustrated in FIG. 7, the connector 631 is a connector coupled with a plurality of second thin wires TL21 being a subset of the plurality of second thin wires TL2 routed to the first surface 5B1 side. The connector 631 is disposed such that a coupling surface 6311 coupled with the plurality of second thin wires TL21 extends along the +X direction and faces in the −Y direction as viewed from the +Z direction. Note that, in the embodiment, the connector 631 is disposed at approximately the same position as the position in the substrate 5A where the second coupling portion 62 is disposed.

As illustrated in FIG. 8, the connector 632 is disposed in a site of the substrate 5B on the −Y direction side. To the connector 632, a plurality of second thin wires TL22 being another subset of the plurality of second thin wires TL2 routed to the second surface 5B2 side, are coupled. The connector 632 is disposed such that a coupling surface 6321 coupled with the plurality of second thin wires TL22 extends along the +X direction and faces in the −Y direction as viewed from the −Z direction.

Note that, in a position in the substrate 5B on the −Y direction side with respect to the connector 632, two rows of the circuit elements 56, each including two circuit elements 56 arranged along the +X direction, are arranged along the +Y direction, and thus a total of four circuit elements 56 are mounted. The four circuit elements 56 are covered in the −Z direction by the plurality of second thin wires TL22. However, the circuit elements 56 covered by the second thin wires TL22 may not be provided.

Further, the number of the second thin wires TL21 coupled to the connector 631 and the number of the second thin wires TL22 coupled to the connector 632 may be different or the same.

With the relay apparatus 3B and a display system including the relay apparatus 3B in place of the relay apparatus 3A, the same effects as the relay apparatus 3A and the display system 1 described above can be achieved, and the following effects can further be achieved.

The second coupling portion 63 included in the substrate 5B includes the connector 631 and the connector 632. The connector 631 is the third connector positioned on the first surface 5B1 and coupled with the plurality of second wires TL21 being a subset of the plurality of second thin wires TL2. The connector 632 is the fourth connector positioned on the second surface 5B2 and coupled with the plurality of second wires TL22 being another subset of the plurality of second thin wires TL2.

As a result, the plurality of second thin wires TL2 are divided into the subsets separately coupled to the connector 631 or 632. As a result, the number of the first thin wires TL1 coupled to each of the connectors 611 and 612 of the first coupling portion 61 and the number of the second thin wires TL2 coupled to each of the connectors 631 and 632 of the second coupling portion 63 can be set so that the dimension of the substrate 5B in the +X direction can be smaller than the dimension of the substrate 5A in the +X direction.

Second Modified Example of First Embodiment

The arrangement of the connectors included in the first coupling portion 61 and the second coupling portion 62, is not limited to the arrangement in which the coupling surface, to which the first thin wires TL1 or the second thin wires TL2 are coupled, extends along the +X direction and faces in the +Y direction or the −Y direction, as viewed from the +Z direction or the −Z direction.

For example, the connector may be disposed such that the coupling surface to which the thin wires are coupled is angled in the +Y direction. The connector may be disposed such that the coupling surface extends along the +Y direction and faces in the +X direction or the −X direction.

Figure 9:
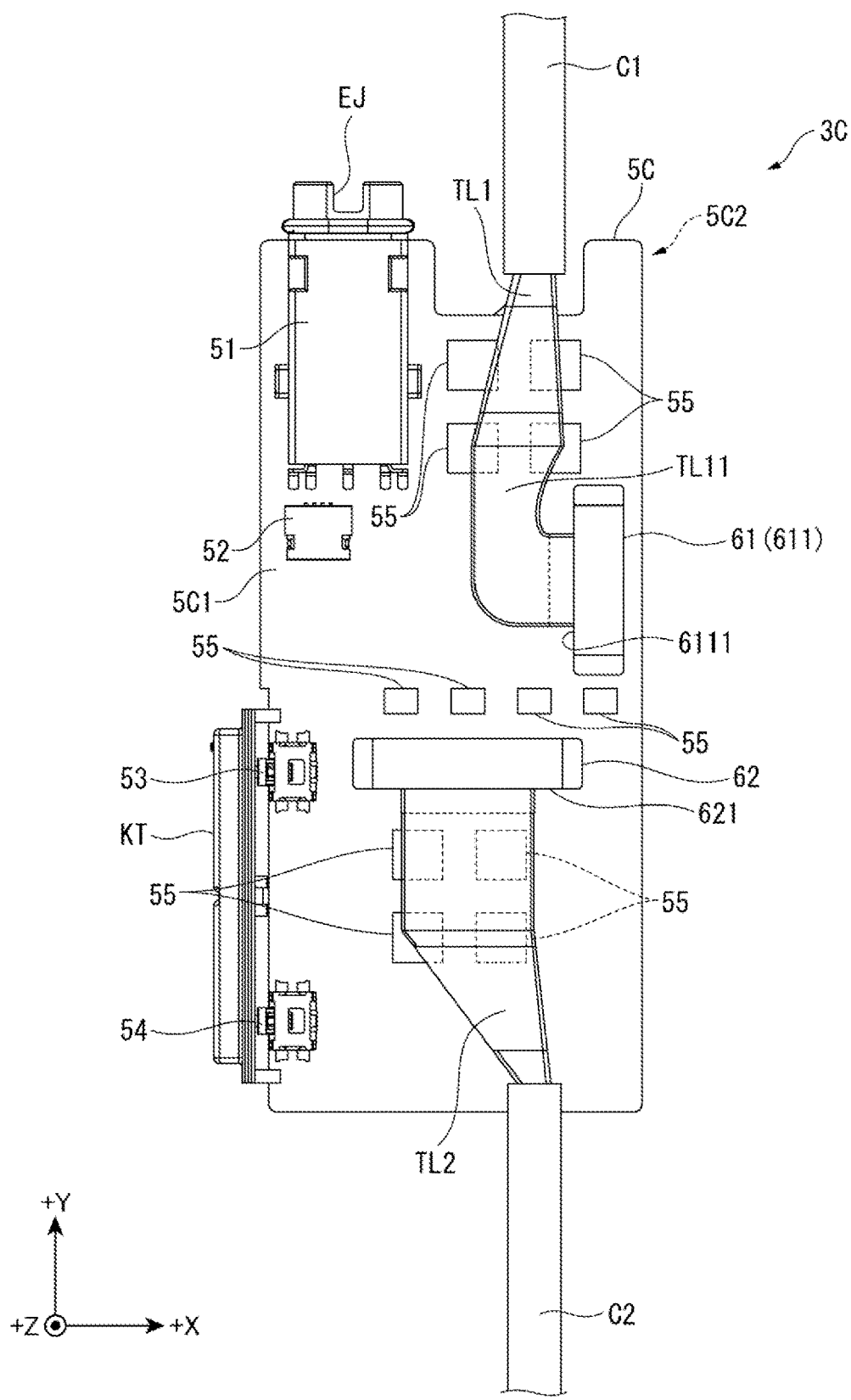
FIG. 9 is a front view of the substrate in a variation of the relay apparatus according to First Embodiment.

FIG. 9 is a front view of a substrate 5C in a relay apparatus 3C that is a variation of the relay apparatus 3A.

For example, the relay apparatus 3C illustrated in FIG. 9 may be substituted for the relay apparatus 3A.

Except that the substrate 5C is included instead of the substrate 5A, the relay apparatus 3C has the same configuration and functions as the relay apparatus 3A. Further, except that the first connector 611 included in the first coupling portion 61 is arranged in a different manner, the substrate 5C has the same configuration and functions as the substrate 5A. For example, the substrate 5C includes a first surface 5C1 that is a +Z side surface, a second surface 5C2 that is a −Z side surface and a surface opposite to the first surface 5C1, the first connector 611 and the second coupling portion 62 mounted on the first surface 5C1, and the second connector 612 (not illustrated in FIG. 9) mounted on the second surface 5C2.

In the first surface 5C1 of the substrate 5C, the first connector 611 included in the first coupling portion 61 is disposed such that the first coupling surface 6111, to which the plurality of first thin wires TL11 is coupled, extends along the +Y direction and faces in the −X direction as viewed from the +Z direction. Further, the plurality of first thin wires TL11 are coupled to the first connector 611 along the +X direction. Note that, the second connector 612 (not illustrated) may be disposed such that the second coupling surface 6121 extends along the +Y direction and faces in the +X direction or the −X direction as viewed from the −Z direction.

With the relay apparatus 3C and a display system including the relay apparatus 3C in place of the relay apparatus 3A, the same effects as the relay apparatus 3A and the display system 1 described above can be achieved.

Second Embodiment

Next, Second Embodiment of the present disclosure will be described.

A display system according to the embodiment has a configuration similar to that of the display system 1 according to First Embodiment. However, the display system according to the embodiment differs from the display system 1 in that the relay apparatus further includes a third coupling portion that can be coupled to the second external device. Note that, in the following description, portions that are the same as or substantially the same as the portions described above are designated by the same reference signs, and descriptions thereof will be omitted.

Figure 10:
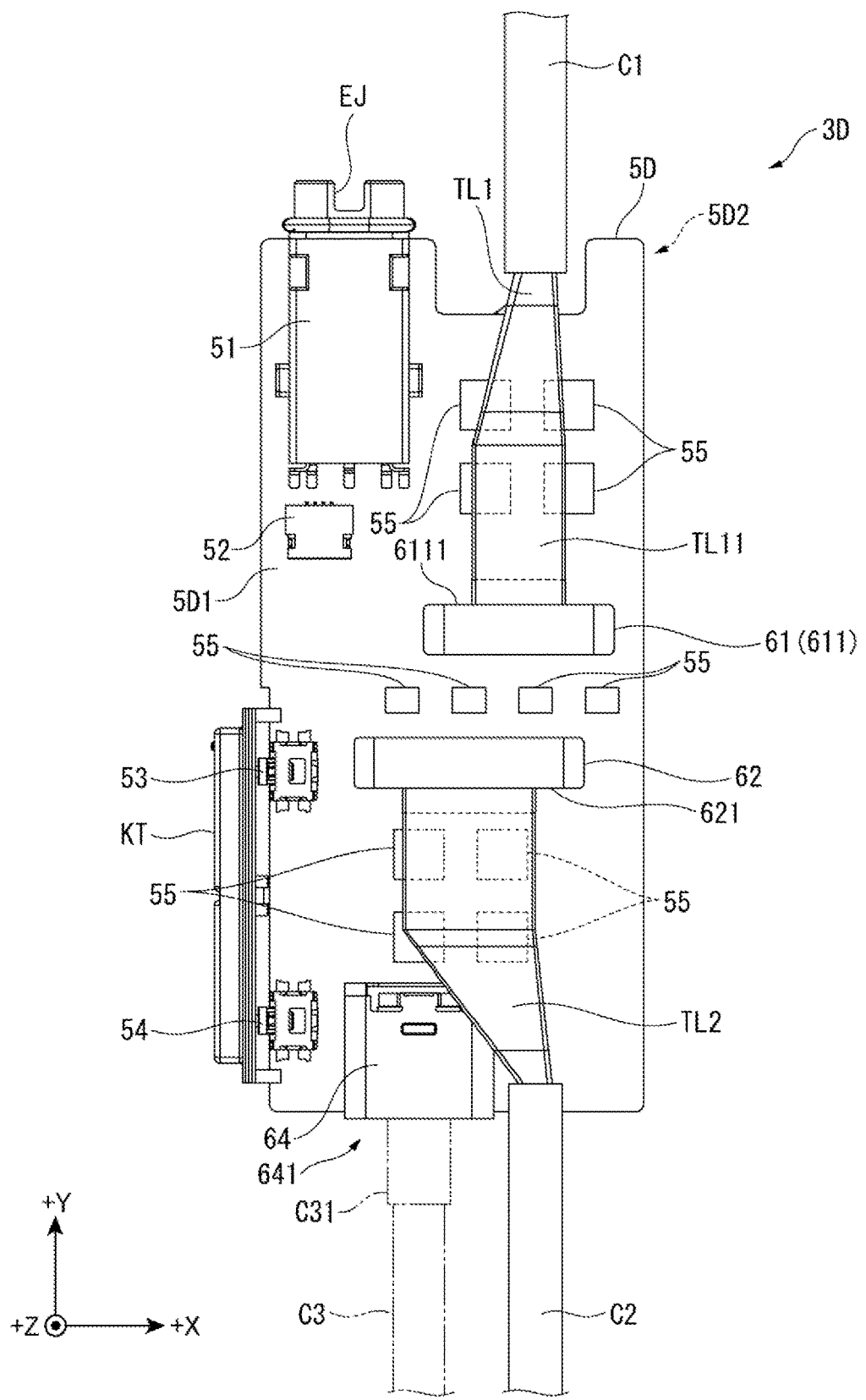
FIG. 10 is a front view illustrating an internal configuration of a relay apparatus included in a display system according to Second Embodiment of the present disclosure.

FIG. 10 is a front view illustrating an internal configuration of a relay apparatus 3D included in the display system according to the embodiment. In other words, FIG. 10 is a plan view of a substrate 5D included in the relay apparatus 3D as viewed from the +Z direction.

The display system according to the embodiment has the same configuration and functions as those of the display system 1, except that the relay apparatus 3D is included instead of the relay apparatus 3A. Furthermore, as illustrated in FIG. 10, the relay apparatus 3D has the same configuration as the relay apparatus 3A, except that the substrate 5D is included instead of substrate 5A.

The substrate 5D has the same configuration and functions as those of the substrate 5A, except that a third coupling 64 is further included. For example, the substrate 5D includes a first surface 5D1 that is a +Z side surface, a second surface 5D2 that is a −Z side surface and a surface opposite to the first surface 5D1, and the first coupling portion 61 and the second coupling portion 62. The first connector 611 of the first coupling portion 61 and the second coupling portion 62 are provided on the first surface 5D1, and the second connector 612 of the first coupling portion 61 is provided on the second surface 5D2.

The third coupling portion 64 is configured as a coupling portion to which a third cable C3 is removably insertable. The third cable C3 is a cable coupled to a second external device (not illustrated) different from the external device ED being the first external device. The third coupling portion 64 is disposed at an edge in the −Y direction of the first surface 5D1 so that an insertion port 581, to which a cable terminal C31 of the third cable C3 is removably insertable, faces in the −Y direction. In other words, the third coupling portion 64 is mounted on the substrate 5D such that electrical signals input from the second external device to the third coupling portion 64 via the third cable C3 can be output to the substrate 5D, or electrical signals input from the substrate 5D can be output to the second external device via the third cable C3.

Although not illustrated in the figure, in the bottom surface portion 44 of the housing 4A of the relay apparatus 3D, an opening is formed at a position corresponding to the insertion port 581. The insertion port 581 is exposed to the outside of the housing 4A via that opening. The insertion port 581 exposed via the opening is positioned substantially centrally in the +Z direction in the bottom surface portion 44.

In addition, in the embodiment, the third coupling portion 64 is configured so that a USB Type-C terminal is removably insertable to the insertion port 581. However, other configurations may be allowed, and thus the third coupling portion 64 may be configured as a coupling portion to which other USB terminals such as a mini USB terminal and a micro USB terminal, or other cable terminals, for example, a cable terminal of a video input cable for DisplayPort, HDMI, or the like is removably insertable.

With the relay apparatus 3D and a display system including the relay apparatus 3D in place of the relay apparatus 3A, the same effects as the relay apparatus 3A and the display system 1 can be achieved, and the following effects can further be achieved.

The substrate 5D included in the relay apparatus 3D includes the third coupling portion 64 provided in a site of the substrate 5D on the −Y direction side being an opposite side to the first direction side. The third coupling portion 64 is a coupling portion to which the third cable coupled to the second external device is removably insertable.

As a result, the relay apparatus 3D can be coupled to the second external device in addition to the external device ED. Therefore, the versatility of the relay apparatus 3D can be enhanced.

Modifications of Second Embodiment

In the relay apparatus 3D, the substrate 5D includes the second coupling portion 62 coupled with the plurality of second thin wires TL2 included in the second cable C2, and the third coupling portion 64 to which the third cable C3 coupled to the second external device (not illustrated) is removably insertable. However, other configurations may be allowed, and thus, the second coupling portion 62 may not be provided. In this case, the third coupling portion 64 may be regarded as the second coupling portion, and the third cable C3 coupled to the third coupling portion 64 may be regarded as the second cable.

Third Embodiment

Next, Third Embodiment of the present disclosure will be described.

A display system according to the embodiment has the same configuration as the display system 1 according to First Embodiment, except for the configuration of the second coupling portion. Note that, in the following description, portions that are the same as or substantially the same as the portions described above are designated by the same reference signs, and descriptions thereof will be omitted.

Figure 11:
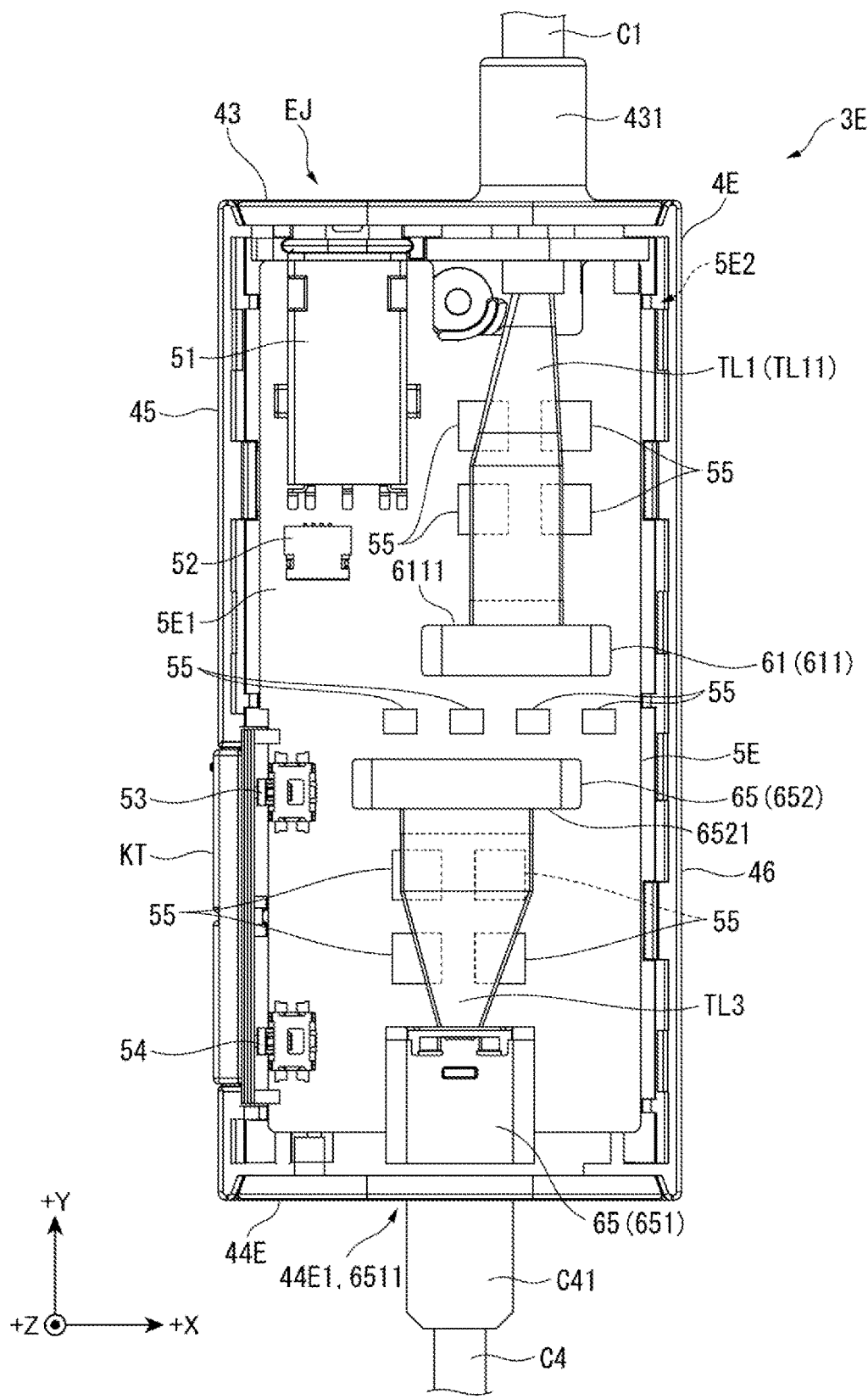
FIG. 11 is a front view illustrating an internal configuration of a relay apparatus included in a display system according to Third Embodiment of the present disclosure.

FIG. 11 is a front view illustrating an internal configuration of a relay apparatus 3E included in the display system according to the embodiment. In other words, FIG. 11 is a plan view of a substrate 5E included in the relay apparatus 3E as viewed from the +Z direction.

The display system according to the embodiment has the same configuration as that of the display system 1 described above, except that the relay apparatus 3E is included instead of the relay apparatus 3A. The relay apparatus 3E has the same configuration and functions as those of the relay apparatus 3A, except that a housing 4E and the substrate 5E are included instead of the housing 4A and the substrate 5A, and a second cable C4 configured to be removably inserted is included instead of the second cable C2, as illustrated in FIG. 11.

The housing 4E has the same configuration and functions as those of the housing 4A, except that a bottom surface portion 44E is included instead of the bottom surface portion 44.

Instead of the holding unit 441, the bottom surface portion 44E includes an opening 44E1 positioned, in the bottom surface portion 44 E, substantially centrally in the +X direction and substantially centrally in the +Z direction. The opening 44E1 exposes, to the outside of the housing 4E, an insertion port 6511 of a second coupling portion 65 mounted on the substrate 5E.

The substrate 5E has the same configuration as that of the substrate 5A, except that the second coupling portion 65 is included instead of the second coupling portion 62. Thus, the substrate 5E includes a first surface 5E1, which is a +Z side surface, and a second surface 5E2, which is a −Z side surface and an opposite surface to the first surface 5E1. Further, the substrate 5E includes the external coupling terminal 51, the coupling element 52, the push switches 53 and 54, the plurality of circuit elements 55, as well as the first connector 611 included in the first coupling portion 61, and the second coupling portion 65, which are provided on the first surface 5E1. Furthermore, although not illustrated in the figure, the substrate 5E includes the second connector 612 included in the first coupling portion 61 and provided on the second surface 5E2, and the plurality of circuit elements 56 and the image processing circuits 57, which are provided on the second surface 5E2.

The second coupling portion 65 includes a terminal portion 651 and a connector 652, which are provided on the first surface 5E1, as well as a plurality of thin wires TL3 for coupling the terminal portion 651 to the connector 652. The terminal portion 651 is provided at an edge of the first surface 5E1 in the −Y direction. The terminal portion 651 is configured as a terminal portion to which the cable terminal C41 of the second cable C4 coupled to the external device ED that is the first external device is removably insertable. The terminal portion 651 is disposed so that the insertion port 6511, to which the cable terminal C41 is removably insertable, opens in the −Y direction. From the +Y side surface of the terminal portion 651, the plurality of thin wires TL3 extend in the +Y direction.

The connector 652 is mounted at a position similar to the position of the second coupling portion 62 in the substrate 5A. In other words, the connector 652 is disposed, in the first surface 5E1, at a position on the +Y side with respect to the terminal portion 651 so that a coupling surface 6521, to which the plurality of thin wires TL3 are coupled, extends along the +X direction and faces in the −Y direction as viewed from the +Z direction. The connector 652 is configured to output, to the substrate 5E, electrical signals input from the second cable C4 via the terminal portion 651 and the plurality of thin wires TL3.

Note that, as described above, on the first surface 5E1, the plurality of circuit elements 55 are mounted between the terminal portion 651 and the connector 652, and the plurality of thin wires TL3 covers, in the +Z direction, the plurality of circuit elements 55.

Effects of Third Embodiment

With the relay apparatus 3E and the display system including the relay apparatus 3E in place of the relay apparatus 3A, the same effects as the relay apparatus 3A and the display system 1 can be achieved.

Specifically, the display system according to the embodiment includes the head-mounted display apparatus 2 to be worn by a user on the head, and the relay apparatus 3E. The relay apparatus 3E is configured to couple the head-mounted display apparatus 2 to the external device ED that is the first external device. The relay apparatus 3E includes the substrate 5E and the first cable C1, which includes the plurality of first thin wires TL1 and extends in the +Y direction being the first direction as viewed from the +Z direction being the normal direction of the substrate 5E. The substrate 5E includes the first surface 5E1 that is a +Z side surface, the second surface 5E2 that is a −Z side surface and a surface opposite to the first surface 5E1, the first coupling portion 61, and the second coupling portion 65. The first coupling portion 61 is located on the +Y direction side and the plurality of first thin wires TL1 are coupled to the first coupling portion 61. The second coupling portion 65 is located on the −Y direction side that is an opposite side to the first direction side and the second cable C4 can be coupled to the second coupling portion 65. The first coupling portion 61 includes the first connector 611 and the second connector 612. The first connector 611 is positioned on the first surface 5E1 and coupled with the plurality of first thin wires TL11 that is a subset of the plurality of first thin wires TL1. The second connector 612 is positioned on the second surface 5E2 and coupled with the plurality of first thin wires TL12 that is another subset of the plurality of first thin wires TL1. Further, the first cable C1 is coupled to the head-mounted display apparatus 2, and the second cable C4 is coupled to the external device ED.

As a result, the same effects as the relay apparatus 3A described above can be achieved, and thus the same effect as the display system 1 can be achieved.

Note that, as described in relation to the variation of Second Embodiment, the connector 652 and the plurality of thin wires TL3 may not be provided, as long as inputting and outputting of electrical signals to be input from and output to the second cable C4, can be performed between the terminal portion 651 and the substrate 5E.

Modifications of Embodiments

Note that the present disclosure is not limited to the embodiments described above and includes any modifications, improvements, and the like as long as the object of the present disclosure can be accomplished.

The configurations described in relation to the above embodiments and modifications may be combined with each other.

For example, the second coupling portion 62 according to Second Embodiment may include a connector provided on the first surface and coupled to the plurality of second thin wires TL21 being a subset of the plurality of second thin wires TL2 routed to the first surface side, and a connector provided on the second surface and coupled to the plurality of second thin wires TL22, which is another subset of the plurality of second thin wires TL2 routed to the second surface side.

In addition, for example, at least one of the first connector 611 and the second connector 612 of the first coupling portion 61 according to Second Embodiment and Third Embodiment, may include a coupling surface extending along the +Y direction and facing in the +X direction or the −X direction as viewed from the normal direction of the first surface or the second surface of the substrate, as described in the second modified example of First Embodiment.

In the above-described embodiments, the plurality of first thin wires TL11, the plurality of second thin wires TL2, TL21, and the plurality of thin wires TL3 each cover, in the +Z direction, the plurality of circuit elements 55, and the plurality of first thin wires TL12 and the plurality of second thin wires TL22 each cover, in the +Z direction, the plurality of circuit elements 56. However, other configurations may be allowed, and thus the plurality of first thin wires TL11, TL12, the plurality of second thin wires TL2, TL21, TL22, and the plurality of thin wires TL3 need not necessarily cover the circuit elements 55 or 56. Furthermore, the number of the circuit elements 55 and 56 covered by the plurality of first thin wires TL11, TL12, the plurality of second thin wires TL2, TL21, TL22, and the plurality of thin wires TL3 can be changed as appropriate.

In the embodiments described above, the first cable C1 is coupled to the head-mounted display apparatus 2, and the second cable C2 or C4 is coupled to the external device ED. However, other configurations may be allowed, and thus the first cable may be coupled to an external device and the second cable may be coupled to a head-mounted display apparatus.

As described above, the second cables C2 and C4 and the third cable C3 are not limited to USB cables, and thus may be other video input cables. Furthermore, the terminals of the second cables C2 and C4 and the terminal of the third cable C3 are appropriately changeable.

In the embodiments described above, in the substrates 5A to 5E, the external coupling terminal 51 including the earphone jack EJ is mounted in a part of the first surface on the +Y direction side. However, other configurations may be allowed, and thus the external coupling terminal 51 may not be provided. Furthermore, when the external coupling terminal 51 is provided on the substrate, the position of the external coupling terminal 51 is not limited to the part of the first surface on the +Y direction side, and can be changed as appropriate. The positions of the coupling elements 52, the push switches 53 and 54, the circuit elements 55 and 56, and the image processing circuit 57 are also appropriately changeable.

In the above embodiments, the earphone jack EJ of the external coupling terminal 51 and the second opening 433 exposing the earphone jack EJ to the outside of the housing are positioned centrally in the +Z direction in the top surface portion 43. However, other configurations may be allowed, and thus the earphone jack EJ and the second opening may not necessarily be positioned centrally in the +Z direction. Also, in the housing of the relay apparatus, the surface in which the earphone jack EJ is exposed may be another surface. Furthermore, as described above, instead of or in addition to the earphone jack EJ, a terminal portion to which another cable terminal is removably insertable may be provided.

In the embodiments described above, the relay apparatuses 3A to 3E include the audio processing circuit, in addition to the image processing circuit 57 mounted on the second surface of the substrate. However, other configurations may be allowed, and thus the relay apparatus may not include at least one of the image processing circuit and the audio processing circuit, and may include another processing circuit instead.

In First Embodiment and Second Embodiment, the second cable C2 extends in the −Y direction, which is the direction opposite to the +Y direction being the extension direction of the first cable C1. However, other configurations may be allowed, and thus the second cable C2 may not necessarily be parallel with the −Y direction, as long as the second cable C2 extends in a direction opposite to the extension direction of the first cable C1 as viewed from the +Z direction. Therefore, the second cable C2 may extend in the −Y direction while being angled toward the +X direction or the −X direction with respect to the −Y direction. Such a configuration may be applied to the extension direction of the second cable C4 in Third Embodiment.

Furthermore, the second cable C2 and the second coupling portion 62, to which the second thin wires TL2 of the second cable C2 are coupled, may also be located at any position between the −X side edge and the +X side edge of the substrates 5A to 5D, as viewed from the +Z direction. For example, when the extension direction of the second cable C2 is angled with respect to the −Y direction as viewed from the +Z direction, the positions of the second cable C2 and the second coupling portion 62 may be changed, as long as, in a region of the substrates 5A to 5D between the coupling point of the second cable C2 and the −Y side edge, the second cable C2 is not positioned outside of the −X side edge and the +X side edge of the substrates 5A to 5D.

In the embodiments described above, the head-mounted display apparatus 2 includes the display unit 21, the support portion 22, and the temples 23L and 23R. However, the configuration of the head-mounted display apparatus included in the display system is not limited thereto. For example, the head-mounted display apparatus 2 may be worn on the head of the user by using a band or the like instead of the temples 23L and 23R.

The display unit 21 was described as a display unit including the left display unit 21L and the right display unit 21R. However, other configurations may be allowed, and thus one of the left display unit 21L and the right display unit 21R may not be provided.

Further, the left display unit 21L was described as a display unit including the left emitting unit 21L1, which is an image emitting unit, and the left light-guiding unit 21L2, which is a light-guiding unit, and the right display unit 21R was described as a display unit including the right emitting unit 21R1, which is an image emitting unit, and the right light-guiding unit 21R2, which is a light-guiding unit. However, the configuration of the display unit is not limited to thereto. For example, the display panel may be provided at a position corresponding to the eye of the user. In other words, as long as the image is displayed so that the user can visually recognize the image, the configuration of the display unit is not limited to the above configurations.

What is claimed is:

1. A relay apparatus for coupling a head-mounted display apparatus to a first external device, the relay apparatus comprising:
    a substrate;
    a housing configured to accommodate the substrate;
    an external coupling terminal;
    a cable terminal;
    a first cable including a plurality of first wires and extending in a first direction as viewed from a normal direction of the substrate; and
    a second cable extending in a direction opposite the first direction, wherein
    the substrate includes
    a first surface,
    a second surface on a back side of the first surface,
    a first coupling portion to which the plurality of first wires are coupled, and
    a second coupling portion to which the second cable is coupled,
    the first coupling portion includes
    a first connector that is located on the first surface and to which a subset of the plurality of first wires is coupled, and
    a second connector that is located on the second surface and to which another subset of the plurality of first wires is coupled,
    one of the first cable and the second cable is coupled to the head-mounted display apparatus,
    the other of the first cable and the second cable is coupled to the first external device,
    the first coupling portion is provided on a site of the substrate on the first direction side,
    the second coupling portion is provided on a site of the substrate on an opposite side to the first direction side,
    the external coupling terminal is provided on a site of the substrate on the first direction side,
    the cable terminal is removably insertable into the external coupling terminal for inputting and outputting a signal,
    the housing includes
    an outer surface portion intersecting an extension direction of the first cable,
    a first opening located at the outer surface portion, the first cable being inserted through the first opening, and
    a second opening located at the outer surface portion and configured to expose the external coupling terminal, and
    the second opening is positioned centrally at the outer surface portion, in a direction from the second surface toward the first surface of the substrate.

2. The relay apparatus according to claim 1, wherein the second cable includes a plurality of second wires, and the number of the plurality of first wires is greater than the number of the plurality of second wires.

3. The relay apparatus according to claim 2, wherein the second coupling portion includes
    a third connector that is located on the first surface and to which a subset of the plurality of second wires is coupled, and
    a fourth connector that is located on the second surface and to which another subset of the plurality of second wires is coupled.

4. The relay apparatus according to claim 1, wherein the substrate includes a third coupling portion that is provided on a site of the substrate on an opposite side to the first direction side and into which a third cable, coupled to a second external device, is removably insertable.

5. The relay apparatus according to claim 1, wherein the external coupling terminal is provided on the first surface, and
    out of the plurality of first wires, the number of the first wires coupled to the first connector is smaller than the number of the first wires coupled to the second connector.

6. The relay apparatus according to claim 1, wherein the first connector includes a first coupling surface extending along a direction intersecting the first direction as viewed from a normal direction of the first surface, the subset of the plurality of first wires being coupled to the first coupling surface, and
    the second connector includes a second coupling surface extending along a direction intersecting the first direction as viewed from a normal direction of the second surface, the other subset of the plurality of first wires being coupled to the second coupling surface.

7. The relay apparatus according to claim 1, comprising an image processing circuit provided on the substrate and configured to process image information input from the first external device via the other of the first cable and the second cable to output the processed image information to the head-mounted display apparatus via the one of the first cable and the second cable.

8. The relay apparatus according to claim 1, wherein the first cable is coupled to the head-mounted display apparatus.

9. A display system comprising:
    a head-mounted display apparatus; and
    the relay apparatus according to claim 1.

10. A relay apparatus for coupling a head-mounted display apparatus to a first external device, the relay apparatus comprising:
    a substrate;
    an image processing circuit provided on the substrate; and
    a first cable including a plurality of first wires and extending in a first direction as viewed from a normal direction of the substrate, wherein
    the substrate includes
    a first surface,
    a second surface on a back side of the first surface, a first coupling portion that is located on the first direction side and to which the plurality of first wires are coupled, and a second coupling portion that is located on an opposite side to the first direction side and to which a second cable is couplable, the first coupling portion includes a first connector that is located on the first surface and to which a subset of the plurality of first wires is coupled, and a second connector that is located on the second surface and to which another subset of the plurality of first wires is coupled, one of the first cable and the second cable is coupled to the head-mounted display apparatus, the other of the first cable and the second cable is coupled to the first external device and the image processing circuit is configured to process image information input from the first external device via the other of the first cable and the second cable to output the processed image information to the head-mounted display apparatus via the one of the first cable and the second cable.

11. A relay apparatus for coupling a head-mounted display apparatus to a first external device, the relay apparatus comprising:

a substrate;

an image processing circuit provided on the substrate;

a first cable including a plurality of first wires and extending in a first direction as viewed from a normal direction of the substrate; and a second cable extending in a direction opposite the first direction, wherein the substrate includes a first surface, a second surface on a back side of the first surface, a first coupling portion to which the plurality of first wires are coupled, and a second coupling portion to which the second cable is coupled, the first coupling portion includes a first connector that is located on the first surface and to which a subset of the plurality of first wires is coupled, and a second connector that is located on the second surface and to which another subset of the plurality of first wires is coupled, one of the first cable and the second cable is coupled to the head-mounted display apparatus, the other of the first cable and the second cable is coupled to the first external device, and the image processing circuit is configured to process image information input from the first external device via the other of the first cable and the second cable to output the processed image information to the head-mounted display apparatus via the one of the first cable and the second cable.

* * * * *